US008534852B2

(12) United States Patent
Morita

(10) Patent No.: US 8,534,852 B2
(45) Date of Patent: Sep. 17, 2013

(54) MIRROR UNIT OF EXPOSURE DEVICE AND IMAGE FORMING APPARATUS USING MIRROR UNIT

(75) Inventor: Shinji Morita, Kunitachi (JP)

(73) Assignee: Konica Minolta Business Technologies, Inc. (JP)

(*) Notice: Subject to any disclaimer, the term of this patent is extended or adjusted under 35 U.S.C. 154(b) by 257 days.

(21) Appl. No.: 12/880,272

(22) Filed: Sep. 13, 2010

(65) Prior Publication Data

US 2011/0069407 A1   Mar. 24, 2011

(30) Foreign Application Priority Data

Sep. 18, 2009   (JP) .................................. 2009-217162

(51) Int. Cl.
*G02B 7/182*   (2006.01)
*G02B 26/08*   (2006.01)

(52) U.S. Cl.
USPC ...................... 359/871; 359/221.2; 359/212.2

(58) Field of Classification Search
USPC ..................................................... 359/221.2
See application file for complete search history.

(56) References Cited

U.S. PATENT DOCUMENTS 7,663,792 B2 *   2/2010   Nakayama et al. ......... 359/212.1
2006/0126148 A1 *   6/2006   Ushio .......................... 359/212

FOREIGN PATENT DOCUMENTS

JP   11-202409 A   7/1999
JP   2003-263000 A   9/2003

* cited by examiner

*Primary Examiner* — Jade R Chwasz
(74) *Attorney, Agent, or Firm* — Cantor Colburn LLP

(57) ABSTRACT

A mirror unit of an exposure device includes: a mirror having support points including one support point on one end portion in a longitudinal direction thereof and two support points at two portions in a width direction perpendicular to the longitudinal direction on the other end portion thereof; and a mirror base member that holds the mirror in a way to support the mirror at the three support points, wherein the mirror is arranged so that the support point on a side of the one support point and a support point on one side of the two support points is positioned on a scanning optical axis, and so that the longitudinal direction is tilted from the scanning optical axis in the width direction.

9 Claims, 7 Drawing Sheets

MIRROR UNIT OF EXPOSURE DEVICE AND IMAGE FORMING APPARATUS USING MIRROR UNIT

This application is based on Japanese Patent Application No. 2009-217162 filed on Sep. 18, 2009 which is incorporated hereinto by reference.

BACKGROUND OF THE INVENTION

The present invention relates to a mirror unit of an exposure device used in an image forming apparatus such as a copying machine, a printer, a facsimile machine and a multifunctional peripheral having functions of the aforesaid equipment, and to an image forming apparatus that uses the mirror unit.

Some of image forming apparatuses such as copying machines and printers are equipped with an exposure device that uses a laser beam for scanning. This exposure device is one that causes a light flux emitted from a light source through light modulation to be deflected periodically by a polygon mirror in accordance with image signals, and to be focused, by a scanning lens, to be in a spot shape on a surface of a photoreceptor drum representing a photoconductor, to conduct light scanning on the surface of the photoconductor, for image recording.

Among these exposure devices, there are known some devices each having been downsized by arranging a mirror in an optical path covering from the aforesaid light source to the photoreceptor drum surface, and by creating an optical path structure wherein a light flux emitted from the aforesaid light source is reflected on the mirror to be projected on the surface of the aforesaid photoreceptor drum surface.

A mirror used in the exposure device is equipped with an angle adjusting mechanism by which an optical axis that is reflected by the mirror and points to the aforesaid photoreceptor drum can be adjusted properly, when an angle of a reflection surface of the mirror is adjusted by the aforesaid angle adjusting mechanism.

FIG. 7 shows a conventional mirror angle adjusting mechanism typically in the aforesaid exposure device. Mirror M is arranged by pointing its longitudinal direction to the direction of the scanning optical axis $L_o$, while fitting its center of gravity G on the scanning optical axis $L_o$.

The aforesaid mirror M has support point "a" on its one end portion in its longitudinal direction and two support points "b" and "c" on its other end portion in the width direction of the mirror, and thereby, the mirror M is supported at three points on a mirror base member that is in the outside of the drawing.

In the arrangement configuration, the support point "a" on the 1-point supporting side of the aforesaid mirror M is set to the center in the width direction of the mirror M so that it may be arranged on the aforesaid scanning optical axis $L_o$, while, the support points "b" and "c" on the 2-point supporting side are set on line-symmetric positions about the center represented by the aforesaid scanning optical axis $L_o$, thereby, the abovementioned center of gravity G is in existence in a triangle area formed by connecting the support points "a", "b" and "c".

And, one of the aforesaid support points "b" and "c" on the 2-point supporting side, namely, support point "c", for example, is configured as a movable adjusting section by an adjust screw, for example.

Owing to the foregoing, when the movable adjusting section (support point "c") is moved slightly in the direction of a space of FIG. 7, the mirror M is slightly rotated on mirror rotary axis 0 represented by a line connecting the aforesaid support points "a" and "b", thus a supporting angle of the mirror M is changed, and an optical axis adjustment is carried out.

Related technologies for the angle adjustment for the mirror M are shown, for example, in Unexamined Japanese Patent Application Publication Nos. H11-202409 and 2003-263000.

In the conventional construction shown in FIG. 7, when adjusting an angle of the mirror M, the mirror M makes a twisted rotation because the mirror M cannot rotate on the scanning optical axis $L_o$, resulting in a possibility that a reflected optical axis is deflected to worsen the accuracy for the optical axis adjustment.

For avoiding this twisted rotation of the mirror M, it is possible to cause a line of mirror rotary axis O that connects these support points "a" and "b" to be adjusted on the scanning optical axis $L_o$, by setting also support point "b" on one side of the aforesaid the 2-point supporting side, on the scanning optical axis $L_o$ in the same way as in the case of support point "a" on the 1-point supporting side. However, in this way, the center of gravity G exists on the mirror rotary axis O, which makes a vibration to affect easily, to have an adverse effect such as pitch unevenness on images.

Therefore, it is considered that these support points "a" and "b" are shifted in the width direction of the mirror M from the upper portion of the scanning optical axis $L_o$ and the mirror rotary axis O is moved in parallel for the scanning optical axis $L_o$, so that the center of gravity G of the mirror M may be in the existence of the triangle area formed by connecting three support points "a", "b" and "c". In this case, however, support point "a" on the 1-point supporting side is caused naturally by the parallel displacement of the mirror rotary axis O for the aforesaid scanning optical axis $L_o$ to lean in the width direction the mirror M from the center in the width direction of the mirror M, and the center of gravity of the mirror on the 1-point supporting side of the mirror M is caused to lean in the other width direction of the mirror M, which makes the twisted rotation of the mirror M to be caused easily.

With the foregoing as a background, an object of the invention is to provide a mirror unit of an exposure device that can avoid a twisted rotation of a mirror in the case of an angle adjustment of the mirror and to provide an image forming apparatus using the aforesaid mirror unit.

SUMMARY OF THE INVENTION (1). To achieve the abovementioned object, a mirror unit of an exposure device reflecting one aspect of the present invention comprises a mirror that is equipped with support points including one support point on its one end portion in its longitudinal direction and two support points at two portions in its width direction on the other end portion; and a mirror base member that holds the aforesaid mirror in a way to support the mirror at the aforesaid three support points, wherein the mirror is arranged so that the support point on the aforesaid 1-point supporting side and a support point on one side of the aforesaid 2-point supporting side may be positioned on the scanning optical axis, and so that its longitudinal direction may be tilted from the scanning optical axis in the direction of the mirror width.

(2). In the mirror unit described in the abovementioned (1), it is preferable that the mirror is arranged so that the center of gravity of the mirror is positioned within a triangle area that is formed by connecting the aforesaid three support points.

(3). In the mirror unit described in the abovementioned (1), it is preferable that the mirror rotates on a mirror rotary axis that is formed by connecting the support point on the aforesaid 1-point supporting side and the support point on one side of the 2-point supporting side.

(4). In the mirror unit described in the abovementioned (1), it is preferable that at least one support point on the 2-point supporting side is of a movable adjusting structure.

(5). In the mirror unit described in the abovementioned (1), it is preferable that the mirror is one that is used for an exposure section in an image forming section of the image forming apparatus.

(6). In the mirror unit described in the abovementioned (5), it is preferable that the aforesaid mirror is composed of a pair of mirrors provided on the aforesaid mirror base member so that mutual reflecting surfaces have an angle of 90 degrees, and at least a mirror on one side is supported on the mirror base member at three points to be capable of adjusting an angle.

(7). In the mirror unit described in the abovementioned (5), it is preferable that the aforesaid mirror base member is equipped, on each of its both end portions in the longitudinal direction, with a fixing bracket having one bolt-through hole through which each fixing bolt passes, and a bolt-through hole of a fixing bracket on at least one side is formed to be an elongated hole, so that the aforesaid mirror base member rotates on the center of the fixing bolt of the fixing bracket on the other side for a photoreceptor that is illuminated by reflected light of the mirror within a range of a length of the bolt-through hole of the fixing bracket on the aforesaid one side, to be capable of adjusting parallelism.

(8). To achieve the abovementioned object, an image forming apparatus reflecting one aspect of the present invention comprises an image forming section; and a mirror unit; wherein the aforesaid mirror unit includes the following construction including: a mirror equipped with support points at one point on one end portion in the longitudinal direction and at two points in the mirror width direction on the other end portion; and a mirror base member that holds the mirror in a way to support the mirror at the aforesaid three support points, and the mirror is arranged so that the support point on the aforesaid 1-point supporting side and a support point on one side of the aforesaid 2-point supporting side may be positioned on the scanning optical axis, and so that a longitudinal direction may be tilted from the scanning optical axis in the mirror width direction.

DETAILED DESCRIPTION OF THE PREFERRED EMBODIMENT

Figure 1:
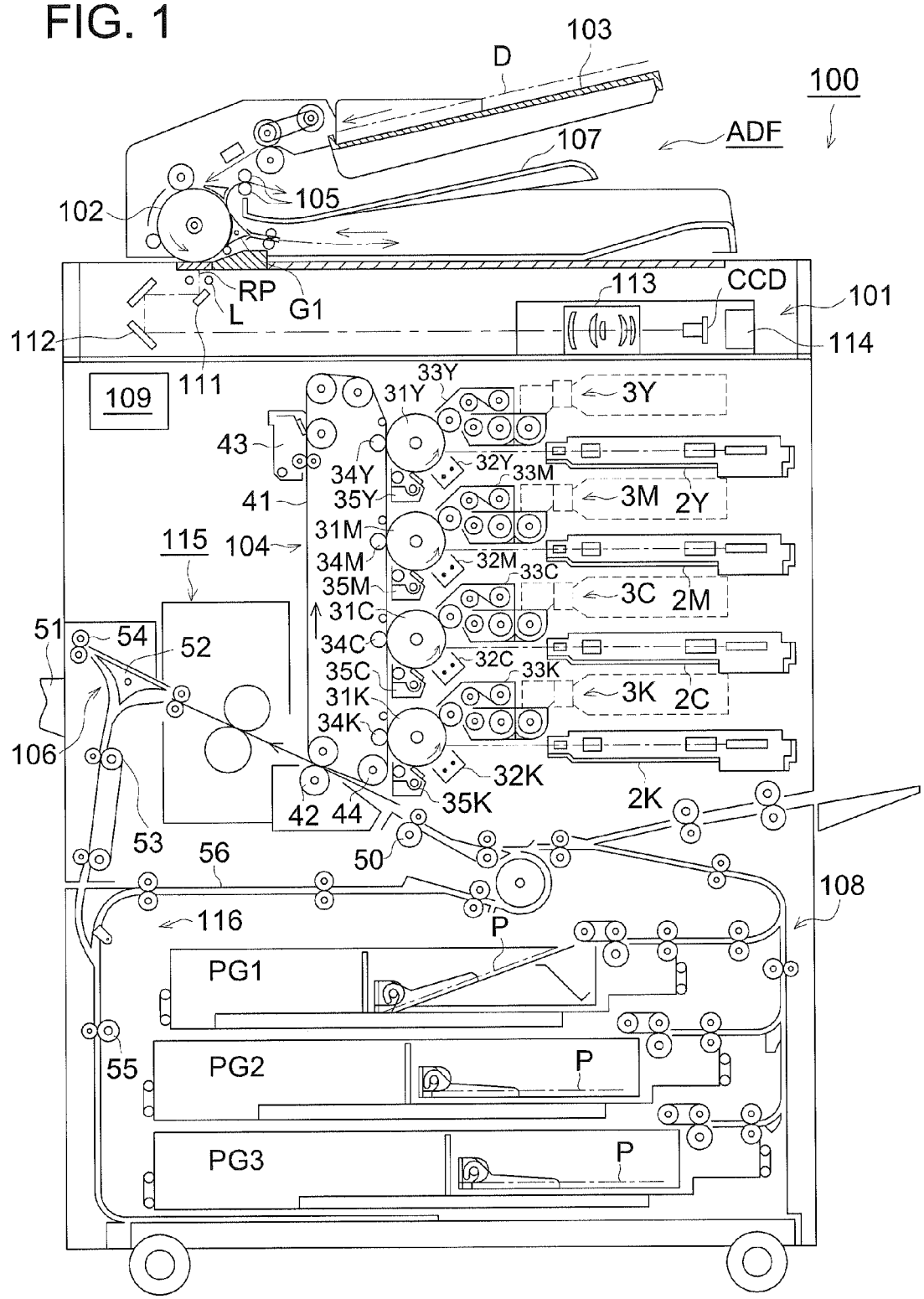
FIG. 1 is a general schematic diagram showing an image forming apparatus serving as an embodiment of the invention conceptually.

An embodiment of the invention will be described in detail as follows, referring to the drawings.

FIG. 1 shows a general construction of the image forming apparatus to which a mirror unit of the exposure device relating to the invention is applied.

The image forming apparatus 100 is one that is called a tandem type color image forming apparatus wherein a plurality of photoreceptors including photoreceptor drums 31Y, 31M, 31C and 31K are arranged in the longitudinal direction to face intermediate transfer belt 41 as an example of an intermediate transfer body, and a full-color image is formed.

The image forming apparatus 100 is equipped, on its upper portion, with automatic document feeder ADF. Documents D placed on document platen 103 of the automatic document feeder ADF are separated into each sheet to be fed out to a document conveyance path, and it is conveyed by conveyance drum 102.

Document reading section 101 reads images of document D that is in the course of conveyance, in document image reading position RP. First conveyance guide G1 and document ejection roller 105 eject document D on which images have been read to document ejection tray 107.

The image forming apparatus 100 is composed of the aforesaid document reading section 101, exposure sections 2Y, 2M, 2C and 2K, image forming sections 3Y, 3M, 3C and 3K, intermediate transfer section 104, fixing section 115, sheet ejection reversing section 106, sheet resupplying section 116, sheet supplying section 108 and of controlling section 109 which are housed in a single casing.

The image reading section 101 illuminates images of document D at document image reading position RP with lamp L, and then, a reflected light resulting from the illumination is guided by first mirror unit 111, second mirror unit 112 and by lens 113, to form an image on a light-receiving surface of image sensor CCD. The image sensor CCD carries out photoelectric conversion for a light beam which has entered the image sensor CCD, and outputs prescribed image signals. For these image signals, image reading control section 114 performs various processes such as A/D conversion, shading correction and compression, and stores them in a storage section of controlling section 109 as image data. For the image data stored in the storage section, an appropriate image processing is performed under the conditions established by a user, and thereby, output image data are generated.

Each of exposure sections 2Y, 2M, 2C and 2K, conducts scanning exposure on the surface of each of photoreceptor drums 31Y, 31M, 31C and 31K charged by each of main charging sections 32Y, 32M, 32C and 32K, corresponding to output information outputted based on output image data sent from the controlling section 109, thus, electrostatic images respectively for Y color, M color, C color and BK color are formed on respective photoreceptor drums 31Y, 31M, 31C and 31K.

The image forming section 3Y is composed of photoreceptor drum 31Y, and of various items arranged on the circumference of the photoreceptor drum 31Y including main charging sections 32Y, developing section 33Y, first transfer roller 34Y and cleaning section 35Y. Other image forming sections 3M, 3C and 3K are also of the same construction as that for the image forming section 3Y, and main charging sections 32M, 32C and 32K, developing sections 33M, 33C and 33K, first transfer rollers 34M, 34C and 34K and cleaning sections 35M, 35C and 35K are arranged respectively on the circumferences of the photoreceptor drums 31M, 31C and 31K.

Developing sections 33Y, 33M, 33C and 33K visualize latent images on photoreceptor drums 31Y, 31M, 31C and 31K by developing with respective yellow (Y) toner, magenta (M) toner, cyan (C) toner, and black (BK) toner. Owing to this, a yellow (Y) toner image, a magenta (M) toner image, a cyan (C) toner image and a black (BK) toner image are formed on photoreceptor drums 31Y, 31M, 31C and 31K respectively.

Each of the first transfer rollers 34Y, 34M, 34C and 34K of intermediate transfer section 104 transfers a toner image formed on each of photoreceptor drums 31Y, 31M, 31C and 31K onto the prescribed position on the intermediate transfer belt 41 to be interposed. A color image is formed on the intermediate transfer belt 41 when toner images each being of a different color are superimposed. The intermediate transfer belt 41 composed of an endless belt is moved by drive power of belt-drive roller 44 while being rotated in the direction shown by an arrow in FIG. 1. Each of cleaning sections 35Y, 35M, 35C and 35K removes toner remaining on the surface of each of photoreceptor drums 31Y, 31M, 31C and 31K on which the transfer of toner image has been completed.

On the other hand, the second transfer roller 42 transfers a color image that has been transferred onto intermediate transfer belt 41 to be superimposed onto sheet P that is conveyed from trays PG1, PG2 and PG3 of sheet feeding section 108 and is fed out while being synchronized by registration roller 50. Belt-cleaning section 43 cleans the surface of intermediate transfer belt 41 on which the transfer of the color image onto sheet P has been completed, and the intermediate transfer belt 41 thus cleaned is ready for the succeeding image transfer.

The sheet P carrying the toner image is sent to fixing section 115 where the sheet P is pressed and heated, so that the toner image is fixed on the sheet P.

Sheet ejection reversing section 106 conveys the sheet P on which the fixing processing has been completed by the fixing section 115, to eject it to sheet ejection tray 51. When ejecting sheet P after reversing it inside out, the sheet P is guided downward by sheet ejection guide 52 temporarily, and the sheet P is reversed and conveyed after the trailing edge of the sheet P is interposed by sheet ejection reversing roller 53, and the sheet P is guided by the sheet ejection guide 52 to be ejected to sheet ejection roller 54.

Incidentally, when forming an image also on the reverse side of the sheet P, the sheet ejection guide 52 conveys the sheet P on which the toner image on the adverse side has been fixed to sheet resupplying section 116 that is positioned at a lower portion, and the sheet P is sent conversely to be reversed, to be sent out to sheet resupplying conveyance path 56, so that the sheet P can be used for image forming on its adverse side.

Figure 2:
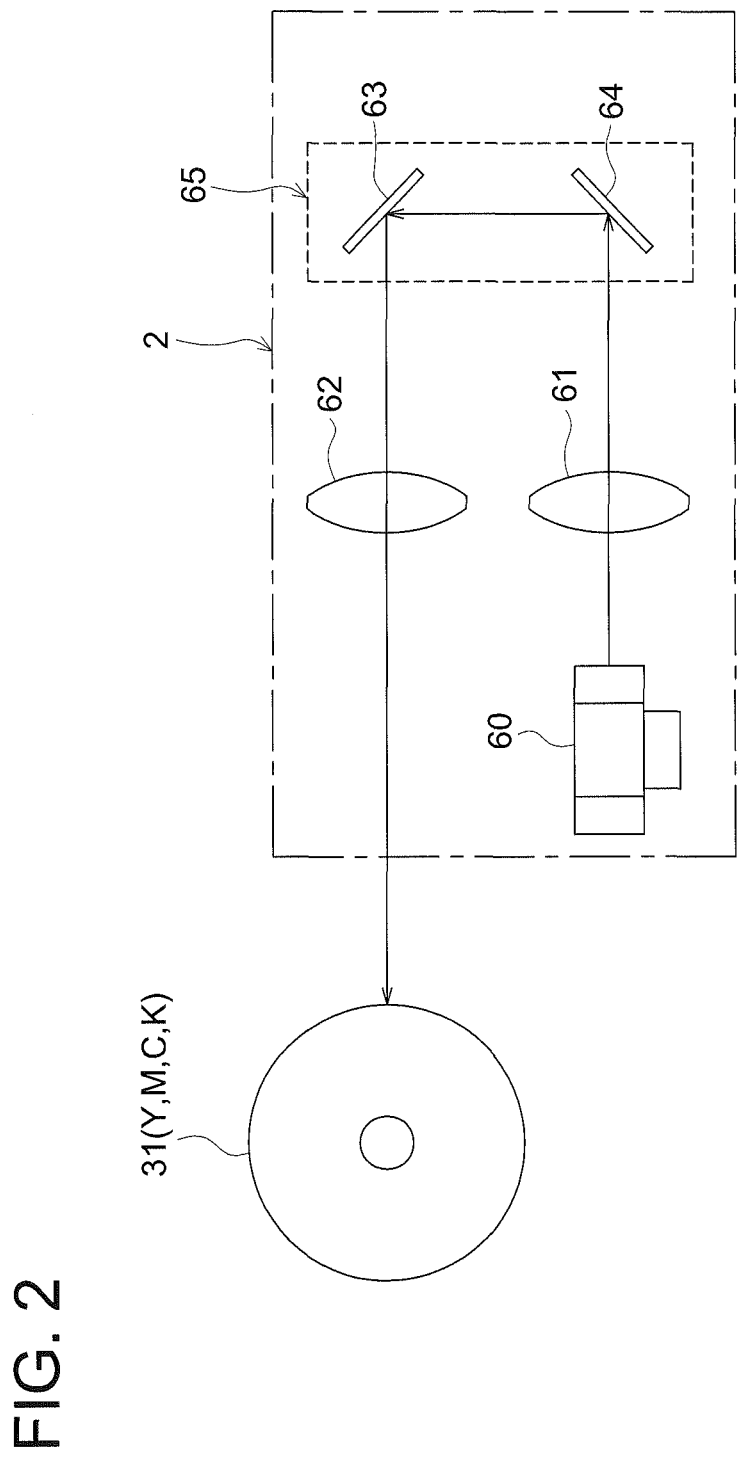
FIG. 2 is an illustration showing typically an exposure device serving as an exposure section in the image forming apparatus shown in FIG. 1.

The aforesaid exposure sections 2Y, 2M, 2C and 2K constitute exposure device 2 shown in FIG. 2.

The exposure device 2 is equipped with mirror unit 65 having thereon polygon mirror 60 that deflects periodically a light flux emitted from a semiconductor laser which is not shown, a plurality of scanning lenses 61 and 62, and a plurality of mirrors 63 and 64.

The mirrors 63 and 64 are arranged with an angle of 90 degrees, and a light flux deflected by polygon mirror 60 enters mirror 64 through scanning lens 61. The light flux entering the mirror 64 is reversed to be in parallel with the entering direction by reflecting functions of the mirror 64 and mirror 63, and is projected on photoreceptor drums 31 (Y, M, C and K) through scanning lens 62.

Deflection scanning by a laser beam by rotation of polygon mirror 60 is writing of image data in the main scanning direction of photoreceptor drums 31 (Y, M, C and K) which are charged in the aforesaid way. The main scanning direction is a direction that is in parallel with a rotary axis of the photoreceptor drum 31. A sub-scanning direction is a direction that intersects at right angles with a rotary axis of the photoreceptor drum 31. When the photoreceptor drum 31 rotates in the sub-scanning direction, and when the laser beam is caused to do deflection scanning in the main scanning direction, a prescribed electrostatic latent image is formed on the photoreceptor drum 31.

By adopting the optical path structure wherein a light flux deflected by polygon mirror 60 is folded back in parallel by the use of mirror unit 65 having plural mirrors 63 and 64, as stated above, the exposure device 2 can be downsized.

Figure 3:
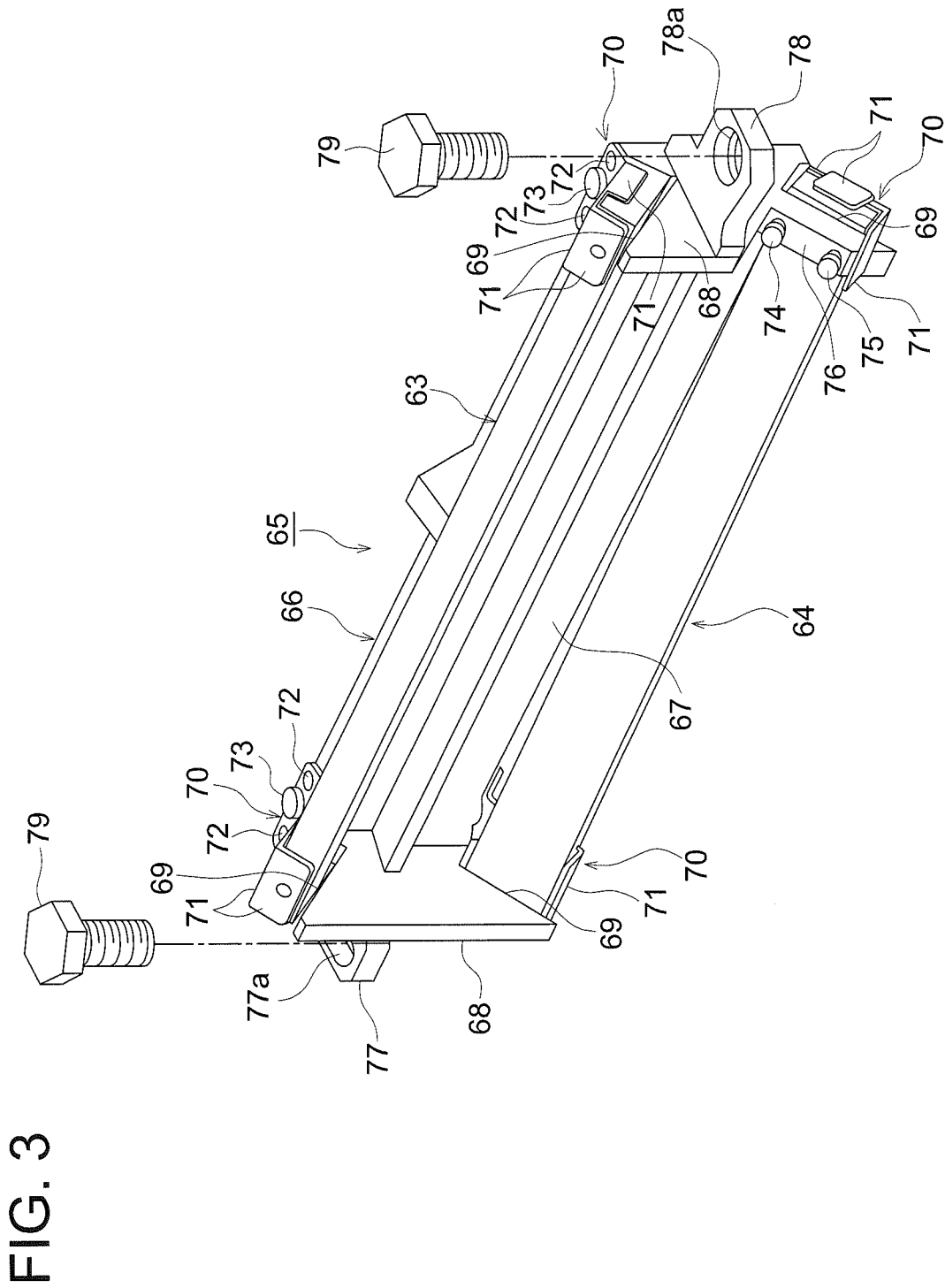
FIG. 3 is a perspective view showing an example of a mirror unit in the exposure device shown in FIG. 2.

Next, an example of the structure of the mirror unit 65 will be explained as follows, referring to FIG. 3 to FIG. 5.

The mirror unit 65 is equipped with the aforesaid paired mirrors 63 and 64 which are arranged in the scanning optical direction of the laser beam and with mirror base member 66 made of metal that holds the mirrors 63 and 64.

The mirror base member 66 is equipped with longitudinal wall 67 that is formed to be long laterally and with end wall 68 each being formed to be protruded forward on the both ends of the longitudinal wall 67, and on each of the upper surface and the lower surface of the end wall 68, there is formed mirror accepting groove 69 whose side is in an L-shape, and depth is equivalent to thickness of each of mirrors 63 and 64.

Each of upper mirror accepting groove 69 and lower mirror accepting groove 69 is provided at an angle of 90 degrees toward the front of the end wall 68, and it is fixed on each of these mirror accepting grooves 69 and 69, so that an angle of the reflecting surface representing each of them facing between the upper and lower mirrors may be set at 90 degrees.

Both end portions of each of the mirrors 63 and 64 are engaged in the vertical direction with the upper and lower mirror accepting grooves 69 and 69, and each end portion of the mirrors 63 and 64 is held elastically by retainer plate 70 composed of an appropriate flat spring.

Figure 4:
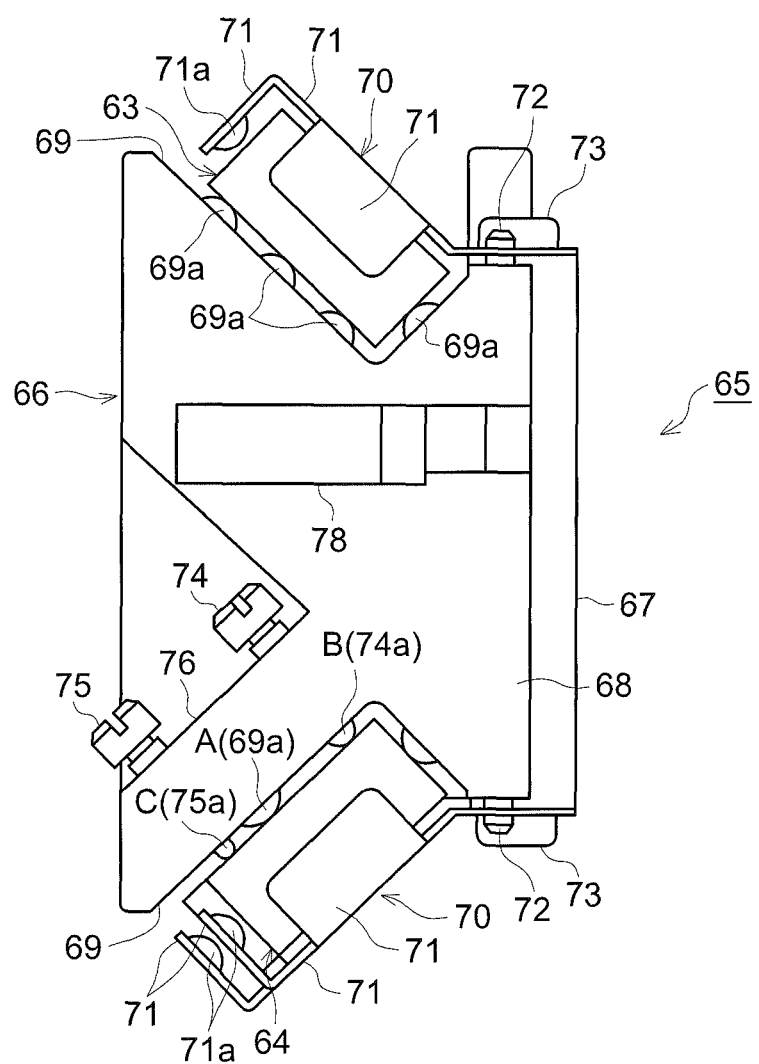
FIG. 4 is a side view of a mirror unit.

A base of the retainer plate 70 is positioned by locating pin 72 on the upper and lower surfaces of the aforesaid longitudinal wall 67, and is fixed by screw 73, and is composed of three holding pieces 71 which hold the mirrors 63 and 64 at each end portion by covering its back surface, a side end surface and a front end surface (see FIG. 4). On the surface of the holding piece 71 that faces the mirror, there is provided hemispherical touching seat 71a which conducts point-contact with the mirrors 63 and 64 to control dispersion of holding sprint force in the surface direction.

Even in the aforesaid mirror accepting grooves 69 and 69, the dispersion of the holding spring force of the aforesaid retainer plate 70 in the surface direction is controlled basically when touching seat 69a that is provided to be protruded in the hemispherical shape on each of front side groove surface and rear side groove surface both forming an L-shape conducts point-contact with the mirrors 63 and 64.

In the present embodiment, the mirror 63 on the upper side is made to be a standard mirror that is fixed for the aforesaid mirror accepting groove 69 on the upper side, while, the mirror 64 on the lower side is made to be a movable mirror in which an angle of the reflection surface can be adjusted for the standard mirror 63.

Figure 6:
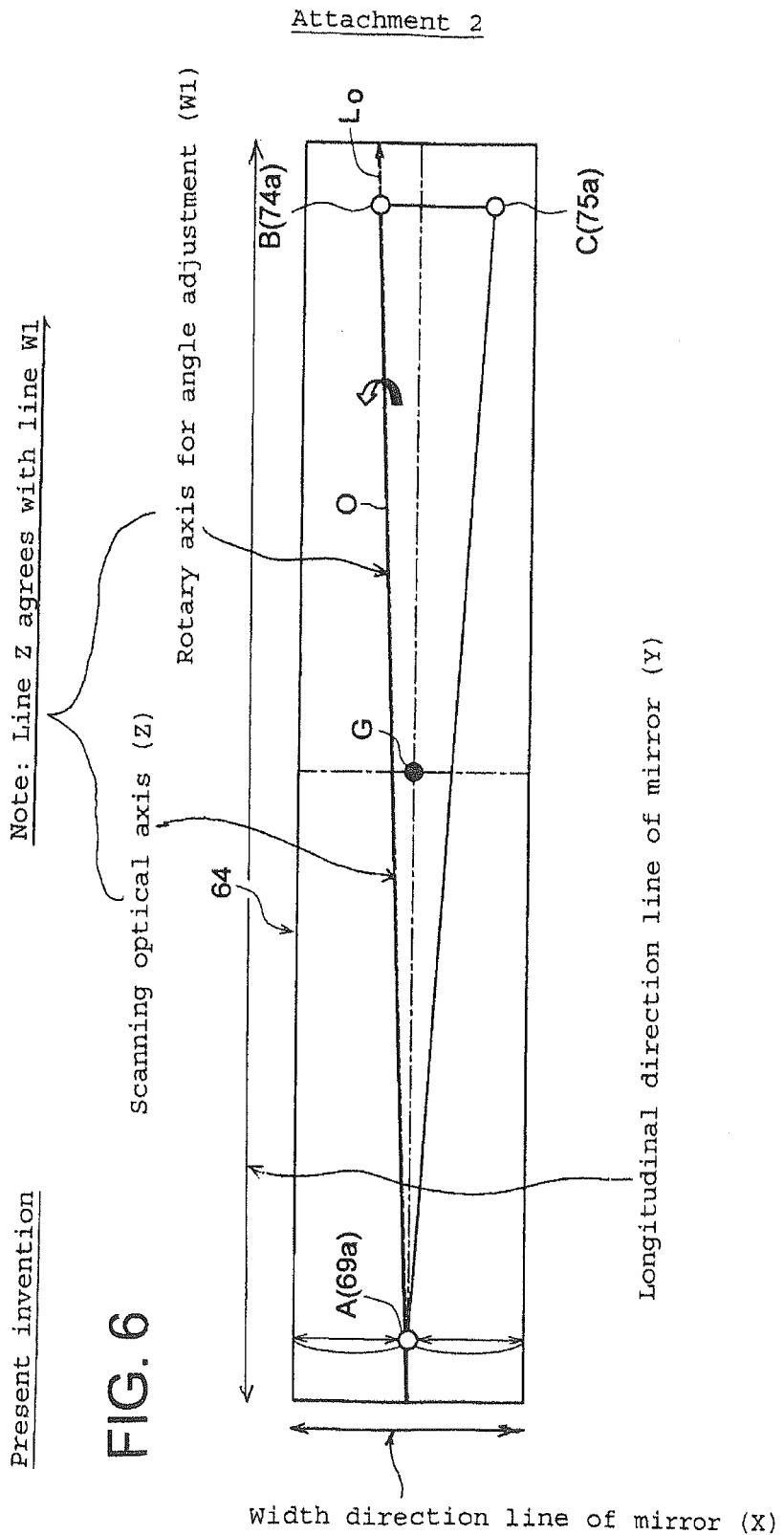
FIG. 6 is an illustration showing typically the mirror angle adjusting mechanism shown in FIG. 3.
Figure 7:
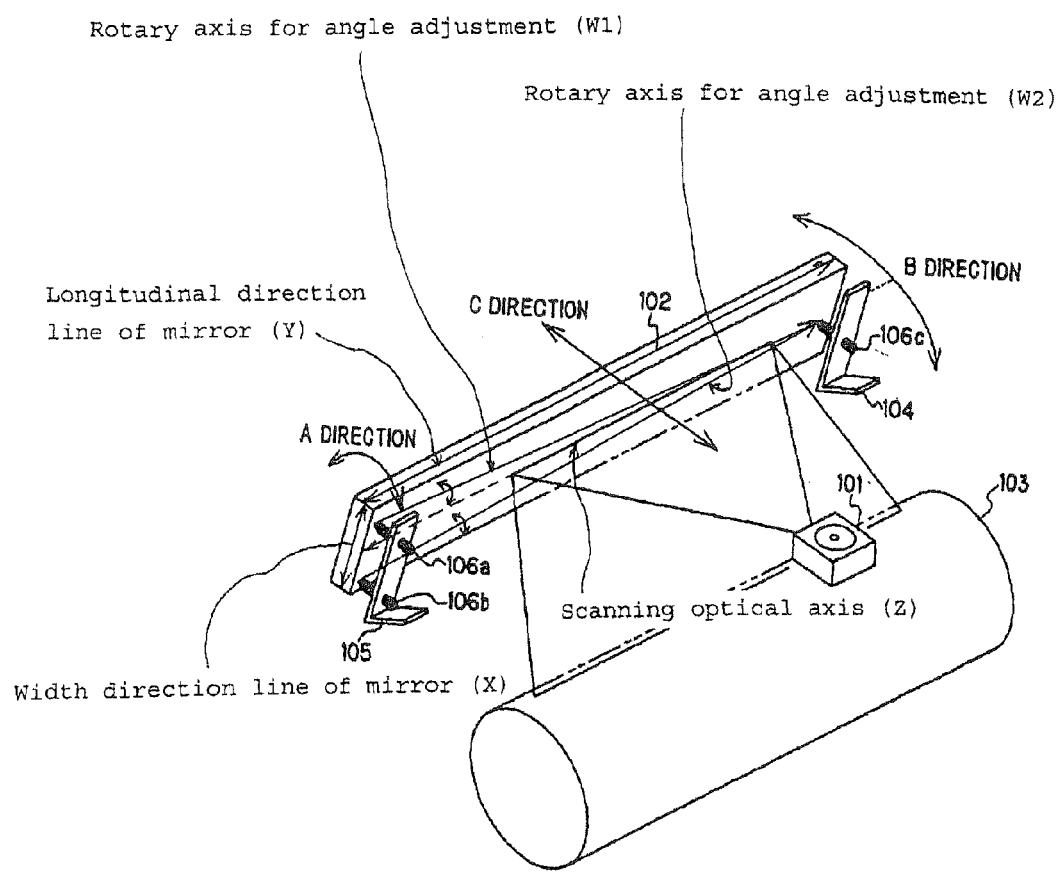
FIG. 7 is an illustration showing typically a conventional mirror angle adjusting mechanism.

FIG. 6 shows typically an angle adjusting mechanism of the mirror 64 on the lower side. The aforesaid mirror 64 has support points A, B and C respectively at one point on one end portion in the longitudinal direction arranged in the scanning optical axis $L_o$, and at two points in the mirror width direction on the other end portion.

Then, the mirror 64 is 3-point-supported on the mirror base member 66 to be capable of adjusting an angle under the condition that a line formed by connecting support point A on this 1-point supporting side and one of support points B and C on the 2-point supporting side, for example, support point B on the upper side is made to be mirror rotary axis 0, while, the support point C on the other side of 2-point supporting side (lower side) is made to be an angle adjustment input point.

The support point A on the 1-point supporting side is composed of the aforesaid hemispherical touching seat 69*a* that is provided on the groove surface on the front side of mirror accepting groove 69.

Each of the support points B and C on the 2-point supporting side is composed of each of tips 74*a* and 75*a* of adjust screws 74 and 75 protruded from the groove surface on the front side of the aforesaid mirror accepting groove 69, in the present embodiment.

Each of the adjust screws 74 and 75 is attached on screw installation surface 76 formed through cutting off on end wall 68 on one side of mirror base member 66, and each of support points B and C on the 2-point supporting side is of the movable adjusting structure to adjust by an amount of screwing in for adjust screws 74 and 75.

As stated above, the mirror 64 on the lower side is 3-point-supported at support points A, B and C, and this mirror 64 on the lower side is arranged so that its longitudinal direction is inclined for the scanning optical axis $L_o$ in the direction of mirror width as is shown in FIG. 6.

Then, when support point A on the 1-point supporting side is set at the center in the mirror width direction, and when this support point A and support point B on the 2-point supporting side are set on the aforesaid scanning optical axis $L_o$, mirror rotary axis O composed of a line formed by connecting these support point A and support point B is aligned on the scanning optical axis $L_o$, and the center of gravity of mirror G is established to be in existence in a triangle area formed by connecting the aforesaid three support points A, B and C.

On the end walls 68 on both sides of the mirror base member 66, there are provided fixing brackets 77 and 78 to be protruded horizontally. On each of these fixing brackets 77 and 78, there is formed one bolt-through hole 77*a* or 78*a*, thus, fixing bolt 79 is inserted in each of the bolt-through holes 77*a* and 78*a*, to be connected and fixed to an exposure unit frame existing outside the drawing.

Figure 5:
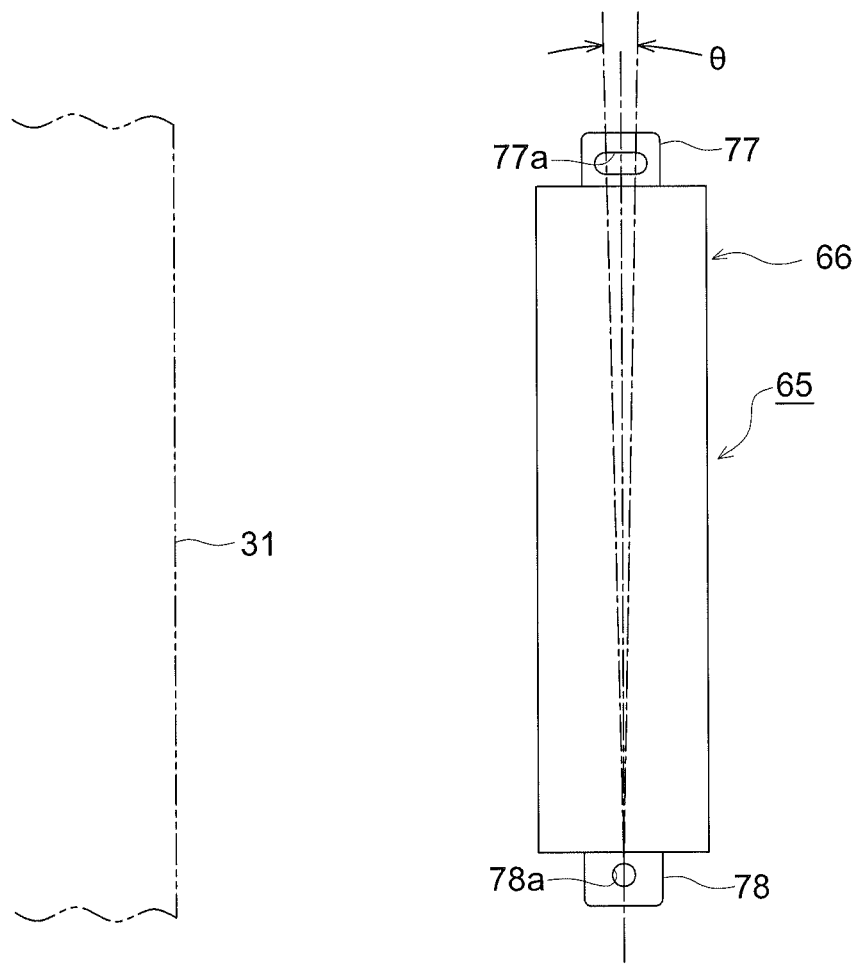
FIG. 5 is a plane illustration showing typically the parallelism adjusting structure of the mirror unit.

One side of the aforesaid bolt-through holes 77*a* or 78*a*, for example, the bolt-through hole 77*a*, is formed to be an elongated hole in the front-back direction along a circular arc whose center is bolt-through hole 78*a* (see FIG. 5).

Owing to the foregoing, the mirror base member 66 is swung on the center of the fixing bolt 79 that is inserted in the bolt-through hole 78*a*, within a range of rotating angle θ corresponding to a range of a length of bolt-through hole 77*a*, which makes it possible to adjust parallelism for the photoreceptor drum 31.

In the mirror unit of the present embodiment having the aforesaid structure, the mirror 64 is rotated on the center of the mirror rotary axis 0 under the condition of mirror rotary axis 0 of the line formed by connecting the support point A and the support point B, thus, an angle of mirror reflection surface can be adjusted, by adjusting an amount of screwing in for adjust screw 75 that constitutes the support point C on the lower side on the 2-point supporting side in the mirror 64.

In this case, a twisted rotation is not caused on the mirror 64 in the case of adjusting the mirror angle, because the mirror rotary axis O is aligned on scanning optical axis $L_o$. In addition, since the support point A on the 1-point supporting side is set at the center in the mirror width and the support points A, B and C are set so that the center of gravity of mirror G may exist within a triangle area that is formed by connecting the aforesaid three support points A, B and C, vibration influence caused by deviation of the center of gravity of mirror G and by deviation of the center of gravity of the mirror on the support point A side of the mirror 64 is not exerted, and occurrence of twisted rotation of the mirror 64 is dissolved, thus, accuracy of exposure can be enhanced.

As a result, when using as a mirror unit of mirror unit 65 for optical path change for exposure sections 2Y, 2M, 2C and 2K in image forming sections 3Y, 3M, 3C and 3K of image forming apparatus 100, an angle of the mirror reflection surface can be adjusted appropriately, and pitch unevenness is not caused on an electrostatic image formed on photoreceptor drums 31Y, 31M, 31C and 31K, thus, accuracy of image quality can be improved.

Further, the mirror 64 and the mirror 63 form a set, and a reflection surface of each of the mirrors 64 and 63 has an angle of 90 degrees and is provided on mirror base member 66, and an angle of the reflection surface of the mirror 64 is adjusted by rotating the mirror 64 on the mirror rotary shaft 0 on a basis of the reflection surface of the mirror 63, whereby, operations of adjusting an optical axis of mirror unit 65 can be carried out easily.

In addition, the aforesaid mirror base member 66 is made to be capable of adjusting parallelism when it is rotated on bolt 79 for fixing bracket 78 on the other side, within a length range of bolt-through hole 77*a* of fixing bracket 77 on one side, for photoreceptor drums 31 (Y, M, C and K), whereby, accuracy of exposure for the photoreceptor drum 31 can further be enhanced.

Moreover, since support points B and C on the 2-point supporting side of the mirror 64 are of the structure of movable adjustment composed of adjust screws 74 and 75, it is possible to conduct fine adjustment of parallelism for the photoreceptor drum 31 by adjustment of an amount of screwing in of the adjust screws 74 and 75, thus, accuracy of adjustment of the parallelism can be enhanced.

Incidentally, in some cases, it is also possible to make all of the aforesaid three support points A, B and C to be of the movable adjustment structure.

In the present embodiment, when the mirror is arranged in a way wherein its longitudinal direction is inclined for the scanning optical axis in the mirror width direction, mirror rotary axis can be aligned on the scanning optical axis by establishing a support point on the 1-point supporting side of the mirror and by establishing a support point on the 2-point supporting side on the 1-point supporting side and the center of gravity of the mirror can be established in the triangle area formed by connecting the aforesaid three support points.

As a result, in the case of adjusting an angle of a mirror, no twisted rotation is caused on the mirror, and vibration influence caused by deviation of the position of the center of gravity of the mirror is not exerted, thus, accuracy of exposure can be enhanced.

What is claimed is:

1. A mirror unit of an exposure device comprising:
   (a) a mirror in which a longitudinal direction thereof is arranged in a scanning optical axis direction, having support points including one support point on one end portion in the longitudinal direction thereof and two support points at two portions in a width direction perpendicular to the longitudinal direction on the other end portion thereof; and
   (b) a mirror base member that holds the mirror in a way to support the mirror at the three support points,
   wherein a line that is formed by connecting the support point on the side of the one support point and one of the support points on the one side of the two support points is made a mirror rotary axis,
   wherein the mirror is three-point supported on the mirror base member to be capable of adjusting an angle under a condition that the other support point on the side of the two support points is made to be an angle adjustment input point, wherein the mirror is arranged so that the longitudinal direction thereof is inclined for the scanning optical axis in the direction of the mirror width, and the support point on the side of the one point support is set at a center in the mirror width direction, and the support point on the side of the one point support and the one support point on the side of the two support points are set on the scanning optical axis, thereby aligning the mirror rotary axis on the scanning optical axis, and wherein the mirror is arranged so that a center of gravity of the mirror is positioned within a triangle area that is formed by connecting the three support points.

2. The mirror unit of claim 1, wherein at least one support point on the side of the two support points has a movable adjusting structure.

3. The mirror unit of claim 1, wherein the mirror is a mirror used for an exposure section in an image forming section of an image forming apparatus.

4. The mirror unit of claim 3, wherein the mirror comprises a pair of mirrors provided on the mirror base member so that mutual reflecting surfaces have an angle of 90 degrees, and at least a mirror on one side is supported on the mirror base member at three points to be capable of adjusting an angle thereof.

5. A mirror unit of an exposure device comprising:
(a) a mirror having support points including one support point on one end portion in a longitudinal direction thereof and two support points at two portions in a width direction perpendicular to the longitudinal direction on the other end portion thereof; and
(b) a mirror base member that holds the mirror in a way to support the mirror at the three support points,
wherein the mirror is arranged so that the support point on a side of the one support point and a support point on one side of the two support points is positioned on a scanning optical axis, and so that the longitudinal direction of the mirror is tilted on a mirror surface with respect to the scanning optical axis in the width direction of the mirror, and
wherein the mirror base member has, on each of both end portions in the longitudinal direction, a fixing bracket having one bolt-through hole through which each fixing bolt passes, and the bolt-through hole of the fixing bracket on at least one side is formed to be an elongated hole, so that the mirror base member rotates on a center of the fixing bolt of the fixing bracket on the other side for a photoreceptor that is illuminated by reflected light of the mirror within a range of a length of the bolt-through hole of the fixing bracket on the one side, to be capable of adjusting parallelism between the mirror base member and the photoreceptor.

6. An image forming apparatus comprising:
(a) an image forming section; and
(b) a mirror unit;
wherein the mirror unit comprising:
(1) a mirror in which a longitudinal direction thereof is arranged in a scanning optical axis direction, having support points including one support point on one end portion in a longitudinal direction thereof and two support points at two portions in a width direction perpendicular to the longitudinal direction on the other end portion thereof; and
(2) a mirror base member that holds the mirror in a way to support the mirror at the three support points,
wherein a line that is formed by connecting the support point on the side of the one support point and one of the support points on the one side of the two support points is made a mirror rotary axis,
wherein the mirror is three-point supported on the mirror base member to be capable of adjusting an angle under a condition that the other support point on the side of the two support points is made to be an angle adjustment input point,
wherein the mirror is arranged so that the longitudinal direction thereof is inclined for the scanning optical axis in the direction of the mirror width, and the support point on the side of the one point support is set at a center in the mirror width direction, and the support point on the side of the one point support and the one support point on the side of the two support points are set on the scanning optical axis, thereby the mirror rotary axis is aligned on the scanning optical axis, and
wherein the mirror is arranged so that a center of gravity of the mirror is positioned within a triangle area that is formed by connecting the three support points.

7. The mirror unit of claim 6, wherein at least one support point on the side of the two support points has a movable adjusting structure.

8. The mirror unit of claim 6, wherein the mirror comprises a pair of mirrors provided on the mirror base member so that mutual reflecting surfaces have an angle of 90 degrees, and at least a mirror on one side is supported on the mirror base member at three points to be capable of adjusting an angle thereof.

9. An image forming apparatus comprising:
(a) an image forming section; and
(b) a mirror unit;
wherein the mirror unit comprises:
(1) a mirror having support points including one support point on one end portion in a longitudinal direction thereof and two support points at two portions in a width direction perpendicular to the longitudinal direction on the other end portion thereof; and
(2) a mirror base member that holds the mirror in a way to support the mirror at the three support points,
wherein the mirror is arranged so that the support point on a side of the one support point and a support point on one side of the two support points is positioned on a scanning optical axis, and so that the longitudinal direction of the mirror is tilted on a mirror surface with respect to the scanning optical axis in the width direction of the mirror, and
wherein the mirror base member has, on each of both end portions in the longitudinal direction, a fixing bracket having one bolt-through hole through which each fixing bolt passes, and the bolt-through hole of the fixing bracket on at least one side is formed to be an elongated hole, so that the mirror base member rotates on a center of the fixing bolt of the fixing bracket on the other side for a photoreceptor that is illuminated by reflected light of the mirror within a range of a length of the bolt-through hole of the fixing bracket on the one side, to be capable of adjusting parallelism between the mirror base member and the photoreceptor.

* * * * *